Feb. 14, 1928.
H. FROEHLICH
GAUGE CONSTRUCTION
Filed Sept. 10, 1920
1,658,840
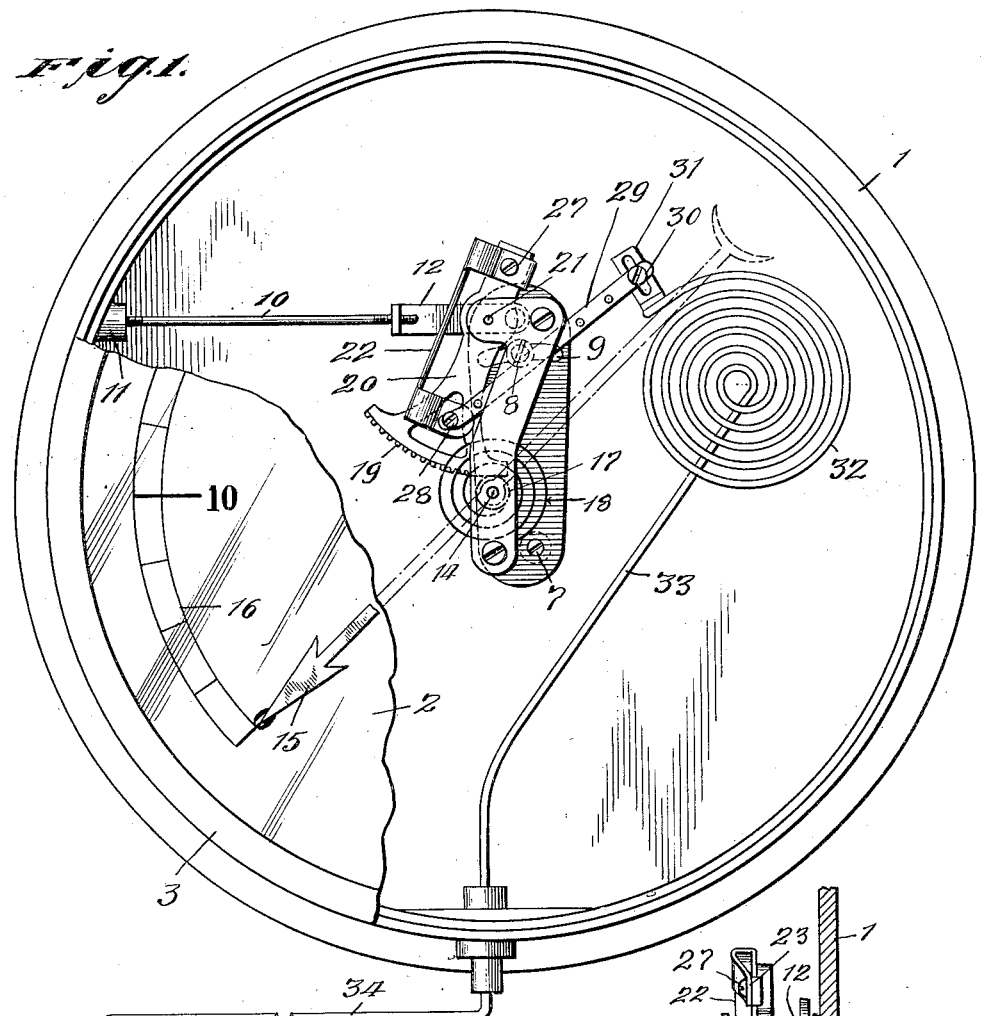
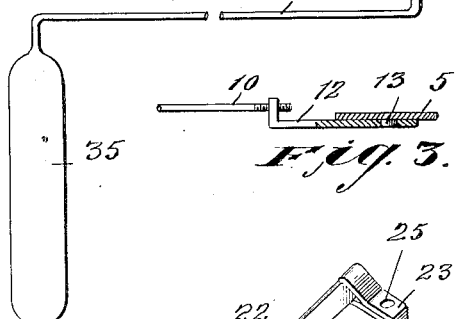
Fig. 3.
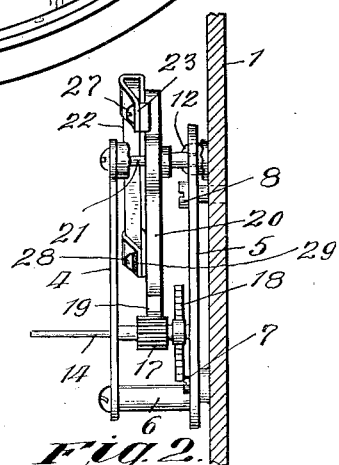
Fig. 2.
Fig. 4.
INVENTOR
Hugo Froehlich
BY
Moses Hammond & Middleton
ATTORNEYS 1,658,840

UNITED STATES PATENT OFFICE.

HUGO FROEHLICH, OF VALLEY STREAM, NEW YORK, ASSIGNOR, BY MESNE ASSIGNMENTS, TO AMERICAN SCHAEFFER & BUDENBERG CORPORATION, OF BROOKLYN, NEW YORK, A CORPORATION OF NEW YORK.

GAUGE CONSTRUCTION.

Application filed September 10, 1920. Serial No. 409,334.

This invention relates to improvements in gauge construction and particularly to thermometers of the type which are used to register the temperature at a point distant from the point at which the indicating part of the thermometer is located.

In a thermometer of this type in order that it shall accurately register the temperature at the distant point, it is necessary that changes in temperature at the point where the indicating part of the thermometer is located must not affect its operation in such a way as to cause it to register a temperature other than the temperature which it is desired to know. In accordance with my invention, the thermometer is so constructed that it will at all times register accurately the temperature at the distant point, even though the instrument part of the thermometer itself is subjected to a temperature differing from that at the distant point, or if the instrument is subjected to a varying temperature.

In the accompanying drawing, forming part of this specification wherein I have shown a preferred embodiment of my invention for the purpose of illustrating the principle thereof;

Figure 1 is a front view, partly broken away, of a thermometer constructed according to and embodying my invention;

Figure 2 is a detail sectional view showing the movement frame and the parts carried thereby, in side elevation;

Figure 3 is a detail view, partly in section, of the frame adjusting means;

Figure 4 is a perspective view of the compensating element.

Referring to the drawing, the thermometer is shown as comprising a casing 1 having an open front which is closed by means of a dial plate 2 and crystal secured in position in any suitable manner, as, for example, by a bezel 3. Mounted within the casing is a movement frame comprising front and rear plates 4 and 5, held in spaced relation to one another by pillars 6. The frame is secured in position by means of screws 7 and 8 extending through the rear plate 5 of the frame and engaging the back of the casing 1, the screw 8 engaging an arc-shaped slot 9 in the rear plate of the frame to permit the frame to be adjusted relatively to the casing. Adjustment of the frame is effected by means of a rod 10 having right and left hand threaded ends, one of which ends engages a threaded opening in a boss 11 on the casing and the other of which ends engages a threaded opening in one end of an L-shaped link 12, the other end of which engages the under surface of rear plate 5 of the movement frame and is provided with a hole adapted to receive a stud 13 projecting rearwardly therefrom. To adjust the movement frame upon the casing, it is merely necessary to loosen the screws 7 and 8, and then to rotate the rod 10 to move the frame about the screw 7 as a pivot. When the frame has been properly adjusted the screws 7 and 8 are tightened to hold it securely in place.

Rotatably supported upon the movement frame is an arbor 14 to the outer end of which is secured an index hand 15 adapted to co-act with a scale 16 on the dial plate 2. A pinion 17 is carried by the arbor 14 and a coiled spring 18 has one of its ends operatively connected to the arbor and its other end secured to one of the spacing pillars 6 of the frame. Meshing with the pinion 17 is a segment 19 at the outer end of a segment lever 20 which is secured intermediate its ends to an arbor 21 rotatably supported upon the movement frame. Carried by the segment lever 20 and extending substantially parallel to the longitudinal axis thereof, is a compensating bi-metallic element 22 provided with laterally extending end portions 23, 24 having the perforation 25 and the threaded perforation 26 formed therein. The bi-metallic element is secured to the segment lever 20 by means of a screw 27 passing through the perforation 25 in the inner end portion 23 thereof and through a registering threaded hole in the inner end of the lever and on its longitudinal axis. The bi-metallic element is preferably so proportioned and constructed that the perforation 26 in its outer end portion 24 will at normal temperatures be substantially in register with the longitudinal axis of the segment lever. Pivotally secured to the outer or free end portion 24 of the bi-metallic element, as by a screw 28 engaging the threaded perforation 26, is one end of a link 29 the other end of which is adjustably and pivotally secured by a shouldered screw 30 to a slotted arm 31 carried by and extending outwardly from the free outer end of a Bourdon spring 32 mounted upon the casing 1. The inner or fixed end of the Bourdon spring is connected through a tube 33 to a flexible capillary tube 34 of desired length, having a bulb 35 at its outer end, adapted to be placed at a point distant from the thermometer, in the usual manner, whereby the thermometer will register the temperature at such distant point. The bulb 35, the tube 33, the capillary tube 34 and the Bourdon spring 32 are filled with a suitable fluid such as mercury, adapted to expand and contract in response to increases and decreases of temperature.

In operation, the Bourdon spring 32 will partially unwind or contract as the temperature at the distant point, at which the bulb 35 is located, increases or decreases, and the movements of the Bourdon spring will actuate the index hand 15, through the link 29, bi-metallic element 22, segment lever 20, segment 19, and pinion 17, to cause the index hand to register accurately upon the scale 16, the temperature to which the bulb 35 is subjected, and such temperature will always be indicated accurately even though the temperature to which the thermometer gauge is subjected may vary, or be different from the temperature to which the bulb is subjected. This important result is due to the construction and arrangement of the several parts of the operating mechanism controlling the movement of the index hand. Should the temperature to which the thermometer gauge itself is subjected change, it will cause a change of volume of the fluid within the Bourdon spring causing it to expand or contract, and such movement of the Bourdon spring, unless counteracted, would tend to actuate the segment lever 20 whereby the index hand would be caused to move to register a temperature either higher or lower than the temperature to which the bulb 35 is subjected. Such undesirable actuation of the segment lever and index hand is prevented, however, by means of the bi-metallic element 22, which is constructed and arranged so as to compensate for the movement of the Bourdon spring when the thermometer gauge is subjected to local temperature changes or to a temperature differing from that to which the bulb is subjected. If for example the Bourdon spring expands or unwinds due to local temperature conditions thereby causing the slotted arm 31 to move towards the right in Fig. 1, the bi-metallic element under the influence of the same local temperature will bend towards the right to such an extent that movement of the segment lever is prevented, as a result of which the index hand will not be moved and will continue to indicate accurately the temperature to which the bulb is subjected. Should the Bourdon spring contract it will tend to move the segment lever in the opposite direction, but the bi-metallic element will then bend in a corresponding direction to such an extent as to prevent any movement of the segment lever and index hand. It will thus be seen that the position of the pivotal point of connection between the link and the free end of the bi-metallic member relative to the longitudinal axis of the segment member will vary with local variations of the temperature to which the thermometer gauge is subjected, and that consequently no changes in the local temperature will affect the accuracy of the thermometer.

As the bi-metallic element 22 is substantially parallel with the longitudinal axis of the segment lever 20 and changes its angular position with the changes in the angular position of the segment lever corresponding with the different parts of the instrument scale, the movement thereof, due to any given change in the temperature to which it is subjected, will tend to cause the segment lever to move a certain definite angular distance irrespective of the position of the segment lever with respect to the link 29 and to the pinion 17. It consequently follows that the bi-metallic element will produce the correct compensating effect at all times irrespective of the angular position of the segment lever and that the instrument will, therefore, be accurately compensated throughout its range of indication. This result has not been attainable in instruments of this character with the compensating devices heretofore employed.

While I have illustrated and described my invention in connection with a preferred embodiment thereof, it will be understood that I do not intend to limit myself to the specific embodiment shown but that I intend to cover my invention broadly in whatever form its principles may be employed.

Having thus described my invention, I claim:—

1. In an instrument of the character described, a segment lever, a compensating element rigidly secured at one end thereto and carried thereby, and a motor element operatively connected to said compensating element.

2. In a gauge of the class described, an indicating hand, a segment lever operatively connected thereto, and means for moving the segment lever including a bi-metallic compensating element fixed at one end to the segmental lever and movable at the other end under influence of temperature changes to either side of the longitudinal axis of the segment lever, to compensate for variations in the temperature at the gauge regardless of the position of the segment lever.

3. In an instrument of the character described, a motor element, a slotted arm secured thereto, a link having one end adjustably secured to said slotted arm, a segment lever and means operatively connected to the other end of said link and to said segment lever to compensate for movement of said motor due to local temperature changes.

4. In an instrument of the character described, a motor element, a segment lever, a bi-metallic element carried by said segment lever and extending substantially parallel with the longitudinal axis thereof, and means operatively connecting said bi-metallic element with said motor element.

5. In an instrument of the character described, a motor element, a segment lever, a bi-metallic element having one end secured to said segment lever and its other end free, said bi-metallic element being substantially parallel to the longitudinal axis of said segment lever, and a link pivotally connected to said motor element and to the free end of said bi-metallic element.

6. In an instrument of the character described, an index hand, a segment lever operatively connected thereto, a motor element and means connecting the motor element and segment lever including a compensating member secured at one end to said segment lever and with its movable end in the longitudinal axis of the segment lever at normal temperatures regardless of the position of the segment lever.

7. In an instrument of the character described, a segment lever, a compensating element rigidly secured thereto, and movable therewith to all positions of the segment lever and a motor element operatively connected to said compensating element.

8. In a distance gauge of the character described an indicator, an operating lever connected thereto, a compensating element responsive to local temperature conditions, mounted on said lever and having its free end automatically adjustable substantially arcuately about the pivot of said lever in response to temperature variations, a Bourdon coil and a link connecting the free end of the compensating element with the Bourdon coil, the outer end of the Bourdon coil being movable by local temperature changes in substantially parallel relation to the free end of the compensating element, and said link being so disposed that the effective lever arms through which said link acts on the operating lever and on the Bourdon coil have a substantially constant ratio throughout the operative range.

In testimony whereof I have affixed my signature.

HUGO FROEHLICH.